(12) United States Patent
Yang et al.

(10) Patent No.: US 10,469,148 B2
(45) Date of Patent: Nov. 5, 2019

(54) METHOD AND DEVICE FOR CHANNEL INFORMATION FEEDBACK

(71) Applicant: Huawei Technologies Co., Ltd., Shenzhen (CN)

(72) Inventors: Xun Yang, Shenzhen (CN); Yi Luo, Shenzhen (CN); Jing Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 72 days.

(21) Appl. No.: 14/942,912

(22) Filed: Nov. 16, 2015

(65) Prior Publication Data

US 2016/0072569 A1    Mar. 10, 2016

Related U.S. Application Data

(63) Continuation of application No. PCT/CN2013/088709, filed on Dec. 6, 2013.

(30) Foreign Application Priority Data

May 16, 2013    (CN) .......................... 2013 1 0181047

(51) Int. Cl.
*H04B 7/06*    (2006.01)

(52) U.S. Cl.
CPC ......... *H04B 7/0626* (2013.01); *H04B 7/0617* (2013.01); *H04B 7/0619* (2013.01); *H04B 7/0621* (2013.01)

(58) Field of Classification Search
None
See application file for complete search history.

(56) References Cited

U.S. PATENT DOCUMENTS

2011/0128929 A1    6/2011  Liu et al.
2011/0299480 A1*   12/2011 Breit ............... H04B 7/0626
                                              370/329

(Continued)

FOREIGN PATENT DOCUMENTS

| CN | 102656938 A | 9/2012 |
|---|---|---|
| CN | 102811119 A | 12/2012 |
| CN | 103037427 A | 4/2013 |
| EP | 2464187 A2 | 6/2012 |

(Continued)

OTHER PUBLICATIONS

U.S. Appl. No. 61/751,558, "Method and Apparatus for communication in an overlapping basic service set", filed Jan. 2013.*

(Continued)

*Primary Examiner* — Christopher M Crutchfield
*Assistant Examiner* — Thinh D Tran
(74) *Attorney, Agent, or Firm* — Leydig, Voit & Mayer, Ltd.

(57) ABSTRACT

The present disclosure provides a method and a device for channel information feedback, where the method includes: obtaining, by a beamformer, channel feedback information, where the channel feedback information includes: channel information related to the beamformer and channel information related to other beamformer; the channel information includes: channel information fed back by a beamformee in a same basic service set and channel information fed back by a beamformee in a different basic service set. Channel feedback of multiple sending ends is achieved in the present disclosure.

15 Claims, 8 Drawing Sheets

(56) References Cited

U.S. PATENT DOCUMENTS

| | | |
|---|---|---|
| 2012/0263126 A1 | 10/2012 | Choi et al. |
| 2012/0264441 A1 | 10/2012 | Chandrasekhar et al. |
| 2012/0327870 A1* | 12/2012 | Grandhi ............... H04W 28/06 370/329 |
| 2014/0080420 A1 | 3/2014 | Yang et al. |
| 2014/0153415 A1* | 6/2014 | Choudhury ....... H04W 72/0446 370/252 |
| 2014/0241201 A1 | 8/2014 | Kim et al. |
| 2015/0295629 A1* | 10/2015 | Xia ..................... H04B 7/0491 370/329 |
| 2015/0359008 A1* | 12/2015 | Wang ................. H04W 74/004 370/330 |
| 2016/0066198 A1* | 3/2016 | Wang ................... H04W 16/28 370/338 |

FOREIGN PATENT DOCUMENTS

| | | |
|---|---|---|
| EP | 2465317 B1 | 8/2014 |
| JP | 2012080534 A | 4/2012 |
| JP | 2012533206 A | 12/2012 |
| WO | WO 2011005048 A2 | 1/2011 |
| WO | WO 2012093794 A2 | 7/2012 |
| WO | WO 2013055120 A1 | 4/2013 |

OTHER PUBLICATIONS

U.S. Appl. No. 61/774,043, "Method and Apparatus for communication in an overlapping basic service set", filed Mar. 2013.*
U.S. Appl. No. 61/819,153, "Methods for Wifi sectorization mac enhancment (wise Mac)" filed May 3, 2013.*

* cited by examiner

METHOD AND DEVICE FOR CHANNEL INFORMATION FEEDBACK

CROSS-REFERENCE TO RELATED APPLICATIONS

This application is a continuation of International Patent Application No. PCT/CN2013/088709, filed Dec. 6, 2013, which claims priority to Chinese Patent Application No. 201310181047.8, filed May 16, 2013, both of which are hereby incorporated by reference in their entireties.

TECHNICAL FIELD

The present disclosure relates to the field of wireless communications technologies, and in particular, to a method and a device for channel information feedback.

BACKGROUND

A multiple input multiple output (MIMO) system in a wireless communication system refers to that multidimensional space resources are built by means of multiple antennas and these multidimensional space resources form multiple parallel paths to improve a data transmission rate by transmitting multiplex signals. If a sending end of a signal may know information of a channel from the sending end to a receiving end, the sending end may enhance a signal-to-noise ratio of the channel through a beamforming (BF) technology, so as to improve signal reception performance of the receiving end. Currently there are multiple methods for the sending end to obtain channel information, for example, the receiving end may feed back the channel information to the sending end.

In prior art, the sending end may be a beamformer, and the receiving end may be a beamformee; there is generally only one beamformer, which sends a null data packet (NDP) to the beamformee, and the beamformee estimates a channel between itself and the beamformer according to the NDP and feeds back obtained channel information to the beamformer. With rapid growth of network overall throughput requirements, increasing a throughput from a perspective of multiple sending ends becomes an important trend, namely, there will be multiple beamformers. However, currently there is no channel feedback mechanism supporting a scenario of multiple beamformers.

SUMMARY

The present disclosure provides a method and a device for channel information feedback, so as to achieve channel feedback of multiple sending ends.

In a first aspect, a method for channel information feedback is provided, including:

sending, by a beamformer, a channel measuring frame to a beamformee;

receiving, by the beamformer, channel feedback information from the beamformee or other beamformer, where the channel feedback information is obtained by the beamformee performing channel estimation according to the channel measuring frame, and the channel feedback information includes: channel information related to the beamformer and channel information related to the other beamformer, where the channel information includes: channel information fed back by a beamformee in a same basic service set and channel information fed back by a beamformee in a different basic service set.

In combination with the first aspect, in a first possible implementation manner, the beamformer is a primary beamformer, and before the receiving, by the beamformer, the channel feedback information from the beamformee or the other beamformer, the method further includes: sending, by the beamformer, sequence indicating information, so that the other beamformer sends a channel measuring frame used for obtaining the channel information according to a sequence specified by the sequence indicating information.

In combination with the first possible implementation manner in the first aspect, in a second possible implementation manner, the sequence specified by the sequence indicating information specifically indicates that the other beamformer starts sending the channel measuring frame after a previous beamformer completes an execution of a local feedback process.

In combination with the first possible implementation manner in the first aspect, in a third possible implementation manner, the sequence specified by the sequence indicating information specifically indicates that the other beamformer starts sending the channel measuring frame after a previous beamformer completes an execution of sending a channel measuring frame.

In combination with the third possible implementation manner in the first aspect, in a fourth possible implementation manner, after the beamformer sends the sequence indicating information and before the beamformer obtains the channel feedback information, the method further includes: sending, by the beamformer, a data packet sending end identifier, where the data packet sending end identifier is used for informing the beamformee that all other beamformers have sent the channel measuring frame.

In combination with any one of the second possible implementation manner to the fourth possible implementation manner in the first aspect, in a fifth possible implementation manner, the sequence indicating information is carried in the channel measuring frame sent by the beamformer.

In combination with the first aspect, in a sixth possible implementation manner, the beamformer is a secondary beamformer, and before the receiving, by the beamformer, the channel feedback information from the beamformee or the other beamformer, the method further includes: receiving, by the beamformer, first sequence indicating information, and sending the channel measuring frame to the beamformee according to a sequence specified by the first sequence indicating information.

In combination with the sixth possible implementation manner in the first aspect, in a seventh possible implementation manner, the receiving, by the beamformer, the first sequence indicating information, includes: receiving, by the beamformer, the first sequence indicating information sent by another beamformer; or, obtaining, by the beamformer, the first sequence indicating information carried in channel information fed back by the beamformee to another beamformer.

In combination with the sixth possible implementation manner in the first aspect, in an eighth possible implementation manner, the sending, by the beamformer, the channel measuring frame to the beamformee according to the sequence specified by the first sequence indicating information, includes: starting sending, by the beamformer, the channel measuring frame after a previous beamformer in a time domain completes an execution of a local feedback process.

In combination with the sixth possible implementation manner in the first aspect, in a ninth possible implementation manner, the sending, by the beamformer, the channel measuring frame to the beamformee according to the sequence specified by the first sequence indicating information, includes: starting sending, by the beamformer, the channel measuring frame after a previous beamformer in a time domain completes an execution of sending a channel measuring frame.

In combination with the ninth possible implementation manner in the first aspect, in a tenth possible implementation manner, when the beamformer sends the channel measuring frame, the method further includes: if the beamformer determines that the channel measuring frame sent by the beamformer is a last data packet indicated in the first sequence indicating information according to the first sequence indicating information, sending a data packet sending end identifier to the beamformee, where the data packet sending end identifier is used for informing the beamformee that all beamformers have sent the channel measuring frame.

In combination with any one of the first aspect to the tenth possible implementation manner in the first aspect, in a eleventh possible implementation manner, before the receiving, by the beamformer, the channel feedback information from the beamformee or the other beamformer, the method further includes: sending, by the beamformer, frequency indicating information to the beamformee, so that the beamformee feeds back the channel information at a frequency indicated by the frequency indicating information.

In a second aspect, a method for channel information feedback is provided, including:
receiving, by a beamformee, a channel measuring frame sent by a beamformer;
performing, by the beamformee, channel estimation to obtain channel feedback information according to the channel measuring frame, and sending the channel feedback information to the beamformer, where the channel feedback information includes: channel information related to a beamformer in a same basic service set and channel information related to a beamformer in a different basic service set.

In combination with the second aspect, in a first possible implementation manner, when the beamformee sends the channel feedback information to the beamformer, the method further includes: sending, by the beamformee, sequence indicating information to the beamformer, so that the beamformer sends the channel measuring frame according to a sequence specified by the sequence indicating information.

In combination with the first possible implementation manner in the second aspect, in a second possible implementation manner, before the beamformee sends the channel feedback information to the beamformer, the method further includes: determining, by the beamformee, that the received channel measuring frame is sent by a last beamformer indicated in the sequence indicating information.

In combination with the second possible implementation manner in the second aspect, in a third possible implementation manner, the determining, by the beamformee, that the received channel measuring frame is sent by the last beamformer indicated in the sequence indicating information, includes: comparing, by the beamformee, a beamformer indentifier corresponding to the received channel measuring frame with the sequence indicating information, and determining that the beamformer is the last beamformer; or, determining, by the beamformee, that the beamformer is the last beamformer according to a received data packet sending end identifier, where the data packet sending end identifier is used for informing the beamformee that all beamformers have sent the channel measuring frame.

In combination with any one of the second aspect to the third possible implementation manner in the second aspect, in a fourth possible implementation manner, the sending, by the beamformee, the channel feedback information to the beamformer, includes: sending, by the beamformee, the channel feedback information to a primary beamformer; or sending, by the beamformee, the channel feedback information to the beamformer which sends the channel measuring frame.

In combination with the fourth possible implementation manner in the second aspect, in a fifth possible implementation manner, before the beamformee sends the channel feedback information to the beamformer, the method further includes: receiving, by the beamformee, frequency indicating information sent by the beamformer; feeding back, by the beamformee, the channel information at a frequency indicated by the frequency indicating information.

In combination with any one of the second aspect to the third possible implementation manner in the second aspect, in a sixth possible implementation manner, the sending, by the beamformee, the channel feedback information to the beamformer, includes: sending, by the beamformee, first channel information in the channel feedback information to the beamformer in the same basic service set, where the first channel information is the channel information related to the beamformer in the same basic service set; after a variable time interval, feeding back, by the beamformee, second channel information in the channel feedback information, where the second channel information is the channel information related to the beamformer in the different basic service set, and the second channel information is fed back to the beamformer in the same basic service set or the beamformer in the different basic service set.

In a third aspect, a beamformer is provided, including:
a data packet sending unit, configured to send a channel measuring frame to a beamformee;
an information obtaining unit, configured to receive channel feedback information from the beamformee or other beamformer, where the channel feedback information is obtained by the beamformee performing channel estimation according to the channel measuring frame, and the channel feedback information includes: channel information related to the beamformer and channel information related to the other beamformer, where the channel information includes: channel information fed back by a beamformee in a same basic service set and channel information fed back by a beamformee in a different basic service set.

In combination with the third aspect, in a first possible implementation manner, the beamformer is a primary beamformer, and the beamformer further includes: a sequence indicating unit, configured to send sequence indicating information, so that the other beamformer sends a channel measuring frame used for obtaining the channel information according to a sequence specified by the sequence indicating information.

In combination with the first possible implementation manner in the third aspect, in a second possible implementation manner, the sequence specified by the sequence indicating information sent by the sequence indicating unit specifically indicates that the other beamformer starts sending the channel measuring frame after a previous beamformer completes an execution of a local feedback process.

In combination with the first possible implementation manner in the third aspect, in a third possible implementation manner, the sequence specified by the sequence indicating information sent by the sequence indicating unit specifically indicates that the other beamformer starts sending the channel measuring frame after a previous beamformer completes an execution of sending a channel measuring frame.

In combination with the third possible implementation manner in the third aspect, in a fourth possible implementation manner, the beamformer further includes: an end indicating unit, configured to send a data packet sending end identifier, where the data packet sending end identifier is used for informing the beamformee that all other beamformers have sent the channel measuring frame.

In combination with any one of the second possible implementation manner to the fourth possible implementation manner in the third aspect, in a fifth possible implementation manner, the sequence indicating unit is specifically configured to carry the sequence indicating information in the channel measuring frame sent by the beamformer.

In combination with the third aspect, in a sixth possible implementation manner, the beamformer is a secondary beamformer, and the beamformer further includes: an indication receiving unit, configured to receive first sequence indicating information; and the data packet sending unit is configured to send the channel measuring frame to the beamformee according to a sequence specified by the first sequence indicating information.

In combination with the sixth possible implementation manner in the third aspect, in a seven possible implementation manner, the indication receiving unit is specifically configured to receive the first sequence indicating information sent by another beamformer; or, obtain the first sequence indicating information carried in channel information fed back by the beamformee to another beamformer.

In combination with the seventh possible implementation manner in the third aspect, in an eighth possible implementation manner, the beamformer further includes: an indication sending unit, configured to send second sequence indicating information to the beamformee when the data packet sending unit sends the channel measuring frame to the beamformee, where the second sequence indicating information at least includes a sequence of sending a channel measuring frame by other beamformers after the beamformer.

In combination with the sixth possible implementation manner in the third aspect, in a ninth possible implementation manner, the data packet sending unit is specifically configured to start sending the channel measuring frame after a previous beamformer in a time domain completes an execution of a local feedback process.

In combination with the sixth possible implementation manner in the third aspect, in a tenth possible implementation manner, the data packet sending unit is specifically configured to start sending the channel measuring frame after a previous beamformer in a time domain completes an execution of sending a channel measuring frame.

In combination with the tenth possible implementation manner in the third aspect, in an eleventh possible implementation manner, the beamformer further includes: an end informing unit, configured to send a data packet sending end identifier to the beamformee when it is determined that the channel measuring frame sent by the beamformer is a last data packet indicated in the first sequence indicating information according to the first sequence indicating information, where the data packet sending end identifier is used for informing the beamformee that all beamformers have sent the channel measuring frame.

In combination with any one of the third aspect to the eleventh possible implementation manner in the third aspect, in a twelfth possible implementation manner, the beamformer further includes: a frequency indicating unit, configured to send frequency indicating information to the beamformee, so that the beamformee feeds back the channel information at a frequency indicated by the frequency indicating information.

In a fourth aspect, a beamformee is provided, including:
an information receiving unit, configured to receive a channel measuring frame sent by a beamformer;
an information sending unit, configured to perform channel estimation to obtain channel feedback information according to the channel measuring frame, and send the channel feedback information to the beamformer, where the channel feedback information includes: channel information related to a beamformer in a same basic service set and channel information related to a beamformer in a different basic service set.

In combination with the fourth aspect, in a first possible implementation manner, the beamformee further includes: a sequence indicating unit, configured to send sequence indicating information to the beamformer, so that the beamformer sends the channel measuring frame according to a sequence specified by the sequence indicating information.

In combination with the first possible implementation manner in the fourth aspect, in a second possible implementation manner, the beamformee further includes: an end determining unit, configured to determine that the received channel measuring frame is sent by a last beamformer indicated in the sequence indicating information before the information sending unit sends the channel feedback information to the beamformer.

In combination with the second possible implementation manner in the fourth aspect, in a third possible implementation manner, the end determining unit is configured to compare a beamformer indentifier corresponding to the received channel measuring frame with the sequence indicating information, and determine that the beamformer is the last beamformer; or, determine that the beamformer is the last beamformer according to a received data packet sending end identifier, where the data packet sending end identifier is used for informing the beamformee that all beamformers have sent the channel measuring frame.

In combination with the the fourth aspect to the third possible implementation manner in the fourth aspect, in a fourth possible implementation manner, the information sending unit is specifically configured to send the channel feedback information to a primary beamformer; or, send the channel feedback information to the beamformer which sends the channel measuring frame.

In combination with the fourth possible implementation manner in the fourth aspect, in a fifth possible implementation manner, the beamformee further includes: an indication receiving unit, specifically configured to receive frequency indicating information sent by the beamformer; and the information sending unit is specifically configured to feed back the channel information at a frequency indicated by the frequency indicating information.

In combination with the fourth aspect to the third possible implementation manner in the fourth aspect, in a sixth possible implementation manner, the information sending unit is specifically configured to send first channel information in the channel feedback information to the beamformer in the same basic service set, where the first channel information is the channel information related to the beamformer in the same basic service set; after a variable time interval, the beamformee feeds back second channel information in the channel feedback information, where the second channel information is the channel information related to the beamformer in the different basic service set, and the second channel information is fed back to the beamformer in the same basic service set or the beamformer in the different basic service set.

According to the method and the device for channel information feedback provided by the present disclosure, the channel feedback information is obtained, where the channel feedback information includes: channel information related to the beamformer, and channel information related to the other beamformer, and thus channel feedback of multiple sending ends is achieved.

DESCRIPTION OF EMBODIMENTS

Figure 1:
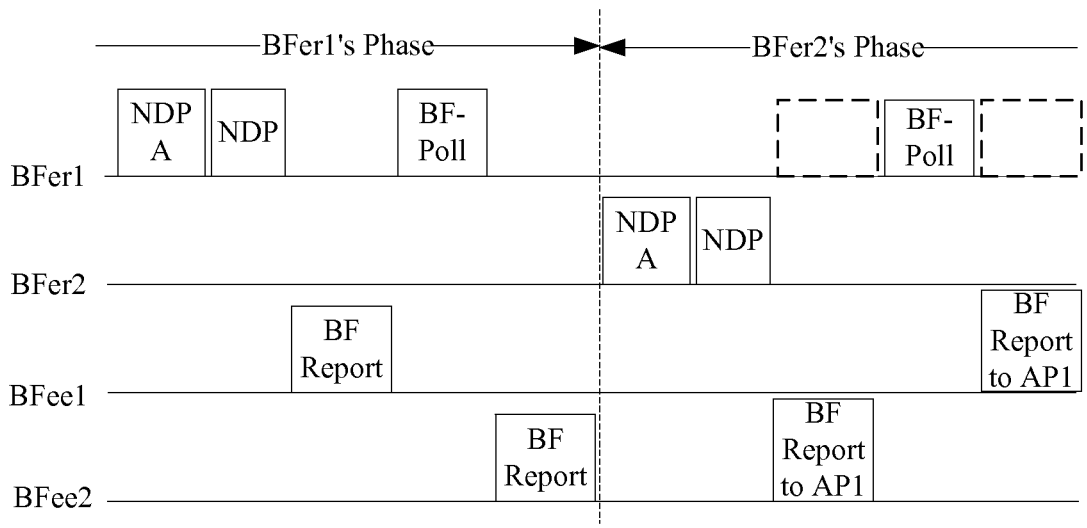
FIG. 1 is schematic flow diagram 1 of an embodiment of a method for channel information feedback in the present disclosure.

A method for channel information feedback in embodiments of the present disclosure is applicable to a case of multiple sending ends, for example, a sending end is a beamformer, a receiving end is a beamformee, the number of beamformers is at least two, and each of at least two beamformers may need to obtain channel information between itself and the beamformee, in such case channel feedback may be executed according to the method for channel information feedback in the embodiments of the present disclosure.

When multiple beamformers exist, there may be multiple basic service sets (BBS). For example, it is supposed that there are two beamformers (BFer 1 and BFer 2 respectively) and two beamformees (BFee 1 and BFee2 respectively), BFee 1 may be associated with BFer 1 to form a BSS, and BFee 2 may be associated with BFer 2 to form another BSS; for BFer 1, BFee 1 may be called as a beamformee in a same BSS of BFer 1, and BFee 2 may be called as a beamformee in a different BSS of BFer 1; Similarly, for BFee 1, BFer 1 may be called a beamformer in a same BSS of BFee 1, and BFer 2 may be called a beamformer in a different BSS of BFee 1.

In the following embodiments of the present disclosure, the above-mentioned two beamformers (BFer 1 and BFer 2) and two beamformees (BFee 1 and BFee2) are taken as an example for illustrating the method for channel information feedback, but it is not limited in specific implementation, for example, both the number of beamformers of the sending end and the number of beamformees of the receiving end may be more than two, which may also be applicable to the method for channel information feedback in the embodiments of the present disclosure.

In various embodiments of the present disclosure, channel feedback information obtained by a beamformer includes: channel information related to the beamformer itself, and channel information related to other beamformer; the channel information includes: for the beamformer, channel information fed back by a beamformee in a same BSS and channel information fed back by a beamformee in a different BSS. In addition, the channel feedback information is received by a beamformee directly from a beamformee, or received from other beamformer. Taking the above-mentioned example for illustration, for example, channel feedback information received by BFer 1 includes: channel information related to BFer 1 itself and channel information related to BFer 2.

In the channel information related to BFer 1, the related channel information described herein includes: channel information fed back by a beamformee (namely, BFee 1) in a same BSS with BFer 1 (the channel information is channel information corresponding to a channel between BFer1 and BFee 1); and channel information fed back by a beamformee (namely, BFee 2) in a different BSS from BFer 1 (the channel information is channel information corresponding to a channel between BFer1 and BFee 2).

Similarly, in channel information related to BFer 2, the related channel information described herein includes: channel information fed back by a beamformee (namely, BFee 2) in a same BSS with BFer 2 (the channel information is channel information corresponding to a channel between BFer2 and BFee 2); and channel information fed back by a beamformee (namely, BFee 1) in a different BSS from BFer 2 (the channel information is channel information corresponding to a channel between BFer2 and BFee 1).

FIG. 1 is schematic flow diagram 1 of an embodiment of a method for channel information feedback in the present disclosure. As shown in FIG. 1, in the present embodiment, BFer 1 is a primary beamformer and BFer 2 is a secondary beamformer. In the present embodiment, both BFer 1 and BFer 2 need to obtain channel information between themselves and beamformees (BFee 1 and BFee 2) and need to send an NDP for receivers to perform channel estimation. A sequence of the two beamformers BFer 1 and BFer 2 sending the NDP is controlled, and the sequence of sending the NDP is controlled by the primary beamformer BFer 1.

Figure 2:
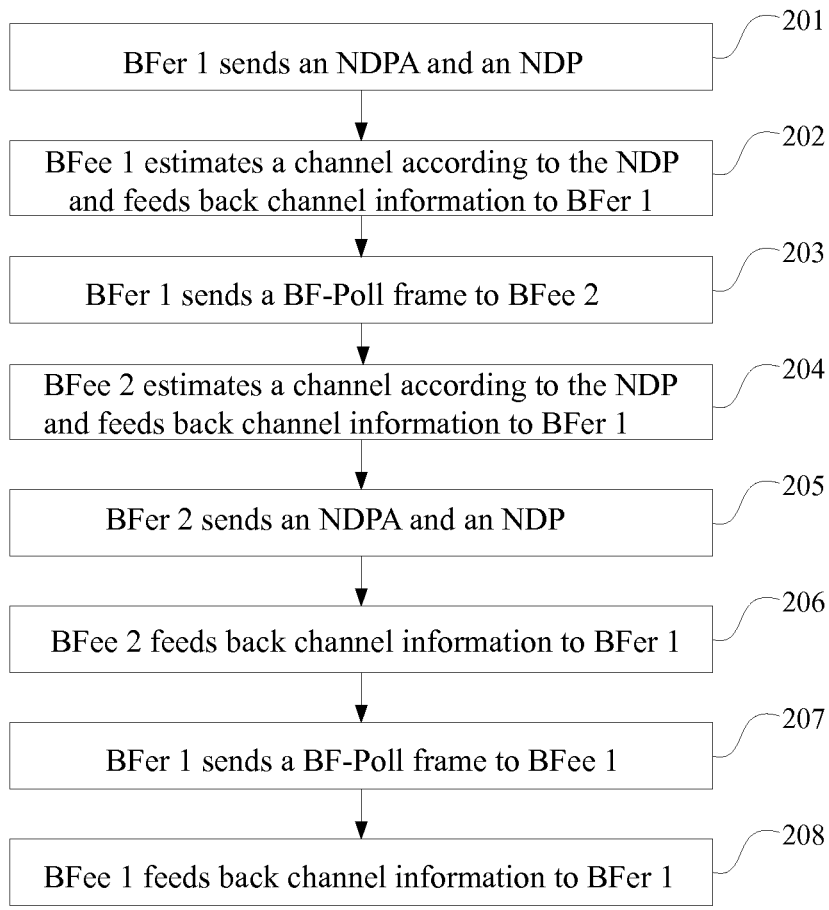
FIG. 2 is schematic flow diagram 2 of an embodiment of a method for channel information feedback in the present disclosure.

FIG. 2 is schematic flow diagram 2 of an embodiment of a method for channel information feedback in the present disclosure, as shown in FIG. 1 combined with FIG. 2, the method of channel information feedback of the present embodiment includes:

201. BFer 1 sends an NDPA and an NDP.

The null data packet announcement (NDP Announcement, referred to as NDPA) and the NDP may generally be received by both BFee 1 and BFee 2, and the NDPA indicates beamformees that need to measure a channel according to the following NDP and feed back channel information, for example, it may include, for BFer 1, beamformee BFee 1 in a same BSS and beamformee BFee 2 in a different BSS.

202. BFee 1 estimates a channel according to the NDP and feeds back channel information to BFer 1.

After receiving the NDPA and the NDP sent by BFer 1, BFee 1 obtains that BFer 1 needs BFee 1 to feed back the channel information according to an indication of the NDPA, and BFee 1 estimates the channel according to the NDP to obtain the channel information. After a fixed time from when the NDP is received, BFee 1 may send the channel information to BFer 1, for example, the fixed time is a shorter inter-frame space (SIFS) or a PCF inter-frame space (PIFS).

203. BFer 1 sends a BF-Poll frame to BFee 2.

After receiving the channel information fed back by BFee 1 in the same BSS, BFer 1 will judge whether the received channel information is correct. If it is correct, the BF-Poll frame is continued to be sent to a next beamformee, such as BFee 2; if it is judged that the channel information is partly or fully incorrect, the BF-Poll frame is sent to BFer 1 if time permits to regain a part which is not correct.

204. BFee 2 estimates a channel according to the NDP and feeds back channel information to BFer 1.

When determining that BFee 2 will also feed back the channel information to BFer 1 according to a previous received indication in the NDPA sent by BFer 1, BFee 2 will also estimate the channel according to the NDP to obtain the channel information, and send the channel information to BFer 1 after receiving a Poll frame from BFer 1 for a first time. Similarly, if BFee 2 subsequently continues to receive the Poll frame from BFer 1, corresponding channel information is retransmitted according to an indication content of the Poll frame.

And now BFer 1 has completed an execution of its corresponding local feedback process (i.e. BFer 1's Phase), where the local feedback process includes: BFer 1 obtains channel information fed back by beamformee BFee 1 in a same BSS and channel information fed back by beamformee BFee 2 in a different BSS. Certainly, in specific implementation, if there is only one BFee, the local feedback process is only referred to channel information feedback by a beamformee in a same BSS.

BFer 2's Phase will be executed next, namely for a sequence of sending the NDP, BFer 1 sends the NDP first and BFer 2 sends the NDP later. As illustrated above, BFer 1 in the present embodiment is a primary beamformer, which controls the sequence in which the two beamformers BFer 1 and BFer 2 send the NDP. Specifically, BFer 1 may control the sequence in this way: BFer 1 may carry sequence indicating information in at least one of the above-mentioned NDPA, NDP or BF-Poll frame; the sequence indicating information is used for enabling other beamformer to send the NDP according to a sequence specified by the indicating information. For example, the sequence specified by the indicating information is "BFer 1-BFer 2" (specific setting form of the sequence indicating information is not limited in the embodiments of the present disclosure), and thus BFer 1 sends the NDP first and BFer 2 sends the NDP later.

Optionally, the sequence indicating information carried in the NDPA, the NDP or the BF-Poll frame by BFer 1 may be received by other beamformer, and the other beamformer may execute the sending according to the specified sequence. When beamformers fail to receive information from each other, such as if BFer 2 fails to receive an NDPA, an NDP and a BF-Poll frame sent by BFer 1, BFer 2 cannot obtain the carried sequence indicating information, in such case, it may be set that beamformees such as BFee 1 and BFee 2 carry the above-mentioned sequence when feeding back the channel information. For example, BFee 1 carries the sequence indicating information when feeding back the channel information in 202, so that BFer 2 may obtain the above-mentioned sequence indicating information from feedback of the beamformee.

Optionally, when there are a greater number of beamformers, in order to further ensure that each beamformer may receive sequence indicating information, it may be set that when sending the NDPA, the NDP or the BF-Poll frame, each beamformer carries the indicating information, and the indicating information may be received by other beamformers, or received by a beamformee and carried in feedback information. Specifically, see BFer 2's Phase next:

205. BFer 2 sends an NDPA and an NDP.

As mentioned above, BFer 2 may receive the sequence indicating information sent by another beamformer (for example, the another beamformer is a primary beamformer, or a beamformer before BFer 2 in a time domain), or may receive the sequence indicating information carried by a beamformee when feeding back channel information to another beamformer, and the two manners may enable BFer 2 to know its sequence of sending the NDP is arranged after which beamformer. BFer 2 may send the NDPA and the NDP according to a sequence specified by the sequence indicating information.

Optionally, when sending the NDPA and the NDP, BFer 2 may indicate in the NDPA the beamformee in a same BSS that needs to measure a channel according to the following NDP, and may also carry the sequence indicating information in at least one of the NDPA, the NDP and the BF-Poll frame sent by BFer 2. If the above sequence indicating information received by BFer 2 is called first sequence indicating information, and sequence indicating information sent by BFer 2 is called second sequence indicating information, the first sequence indicating information and the second sequence indicating information may be same or may be different, for example, a sequence of other beamformers for sending the NDP after BFer 2 in the time domain may be at least included.

It can be seen from FIG. 1 that the sequence specified by the sequence indicating information in the present embodiment specifically indicates that other beamformer starts sending the NDP after a previous beamformer completes an execution of a local feedback process. For example, BFer 2 starts sending an NDP after BFer 1 completes an execution of BFer 1's Phase.

206. BFee 2 feeds back channel information to BFer 1.

The channel information fed back by BFee 2 to BFer 1 is obtained by performing channel estimation after BFee 2 receives the NDPA and the NDP sent by BFer 2, and is channel information corresponding to the channel between BFee 2 and BFer 2. In the present embodiment, it is designed that channel information fed back by all beamformees is fed back to the primary beamformer BFer 1, certainly in specific implementation, other feedback manners may be available, which will be illustrated in the subsequent embodiments, and the manner that the beamformee taking BFer 1 as a feedback destination address in the present embodiment is only an optional manner.

207. BFer 1 sends a BF-Poll frame to BFee 1.

In the manner that the beamformee taking BFer 1 as the feedback destination address in the present embodiment, the primary beamformee BFer 1 is also responsible for judging whether all channel information is correct or not, if it is not correct, BFer 1 requires the related beamformee to retransmit an incorrect part with the BF-Poll frame. If it is judged that the channel information is correct, BFer 1 will continue to send the BF-Poll frame to a next beamformee, namely, BFee 1.

208. BFee 1 feeds back channel information to BFer 1.

And now BFer 1 has received channel information fed back by all beamformees. Subsequently BFer 1 may also send channel information related to BFer 2 (such as the channel information received in steps 206 and 208) received by BFer 1 to BFer 2, and whether to send may specifically be determined according to a transmission mode used actually.

It should be noted that, in the present embodiment and subsequent other embodiments of the present disclosure, that a beamformer sends NDPA+NDP is taken as an example, but in actual implementation, the beamformer only needs to send a channel measurement frame for a beamformee to perform channel estimation, and the channel measurement frame is not limited to NDPA+NDP, for example, it may also be a common data frame, a management frame or the like used for the channel estimation, and the beamformee may estimate and obtain channel information through a preamble or a pilot of the frame, and feed back the channel information to the beamformee.

Further, as an optional feature, a signal indication may be added in the data frame or the management frame (NDPA+NDP form is also included) used for the channel estimation and sent by the beamformer, which aims to enable a beamformee not in a same basic service set to receive and effectively monitor signals from a beamformers of other basic service set. After receiving the frame, the beamformee will fully read the frame even though the frame is not from the same BSS, and calculate the channel information according to the preamble or the pilot of the frame. A specific manner is that one bit is added in a SIG field of the preamble to indicate that the frame needs to be read by an STA in a different BSS. Such indication information may not only be in the SIG field, but also be carried through positions such as phase rotation of the SIG field, a bit of a service field, a bit of frame control or the like.

In addition, two beamformees are taken as an example for illustration in the present embodiment, and thus a BF-Poll frame needs to be sent in order to obtain channel information fed back by the two beamformees, but the number of beamformees is not limited in specific implementation, and there may be one beamformee, for example, if a scenario is that there are two BFers and one BFee, the two BFers do not need to send a BF-Poll to BFee to obtain channel information.

Figure 3:
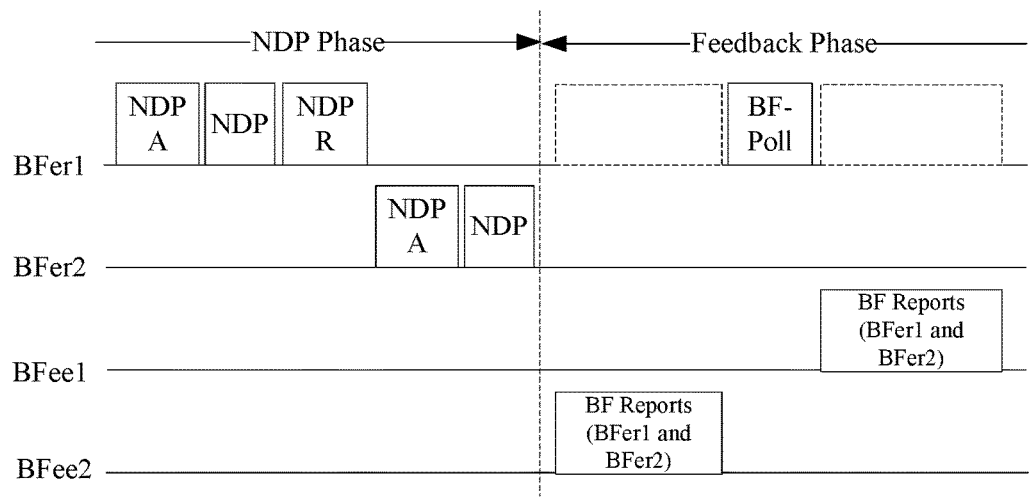
FIG. 3 is a schematic flow diagram of another embodiment of a method for channel information feedback in the present disclosure.

FIG. 3 is a schematic flow diagram of another embodiment of a method for channel information feedback in the present disclosure. Only different points from the above-mentioned embodiment will be described in the present embodiment, and other similar steps will no longer be described in detail. As shown in FIG. 3, main difference between the present embodiment and the above-mentioned embodiment is that, sequence indicating information controlled by a primary beamformer BFer 1 specifically indicates other beamformer starts sending an NDP after a previous beamformer completes an execution of sending an NDP, namely, all beamformers fully complete the sending of the NDP in an NDP Phase as shown in FIG. 3, and then start a Feedback Phase in an unified way in which beamformees perform feedback, not as in the above-mentioned embodiment that each beamformer completes an execution of respective feedback process.

Optionally, the sequence indicating information sent by BFer 1 in the present embodiment may be carried in an NDPA or may be carried in an null data packet request (NDP Request, referred to as NDPR), for example, the NDPR indicates secondary beamformers that next need to send an NDPA and an NDP and a sequence of these beamformers. The sequence indicating information sent by BFer 1 may be received by other secondary beamformers, such as BFer 2, and the NDPA and the NDP are sent according to a sequence specified by the indicating information.

Figure 4:
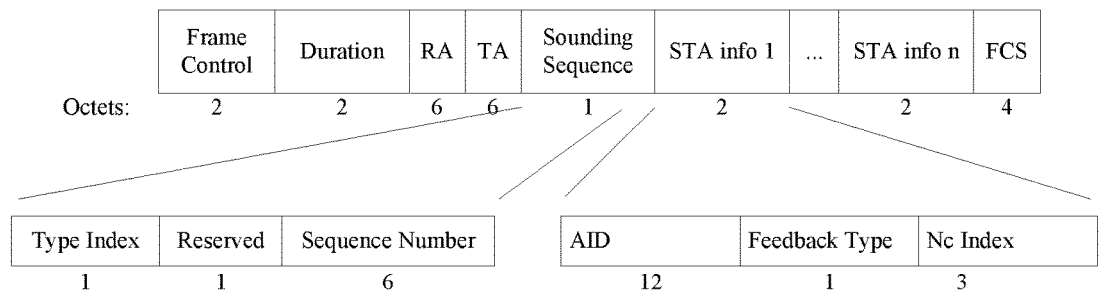
FIG. 4 is an NDPR format schematic diagram of another embodiment of a method for channel information feedback in the present disclosure.

An optional NDPA format is shown in FIG. 4. FIG. 4 is an NDPR format schematic diagram of another embodiment of a method for channel information feedback in the present disclosure. The NDPA format may be multiplexed to indicate a sequence of subsequent beamformers. As shown in FIG. 4, Type Index may be used for indicating a type, for example, it may be set that if Type Index=0, it denotes an NDPA; if Type Index=1, it denotes an NDPR, and vice versa. When the frame indicates the NDPR, STA Info is related information of a beamformer, such as AID is an identifier of the beamformer, and Nc Index is a reserved bit, etc.

For a beamformee, it needs to judge whether an execution of a previous NDP Phase is completed, and whether the beamformee may start an execution of a Feedback Phase. A manner of judgment, optionally, is that the beamformee may compare an identifier of a beamformer for sending an NDP currently according to sequence indicating information indicated by an NDPA or an NDPR received previously, and judge whether the beamformer is a last beamformer indicated in the sequence indicating information; or may determine whether continuous sending of each beamformer ends according to a data packet sending end identifier sent by a beamformer (may be sent by a primary beamformer or a secondary beamformer).

For example, beamformee BFee 2 has received sequence indicating information sent by BFer 1, and an identifier and a sequence of each beamformer are included in the indicating information; when BFee 2 receives an NDPA and an NDP sent by BFer 2, where an identifier of BFer 2 is carried, BFee 2 may determine that the current BFer 2 sending the NDP is the last beamformer based on a comparison between the identifier and the sequence indicating information, and thus BFee 2 may start executing feedback of channel information.

As another example, in a case that a primary beamformer BFer 1 may receive an NDP sent by other secondary beamformers, namely BFer 1 may know whether other beamformers have executed a process of sending the NDP; after BFer 1 obtains that BFer 2 has completed sending of an NDPA and an NDP, BFer 1 may send a data packet sending end identifier, and the data packet sending end identifier, for example, is an NDPR with a null indication, which is used for informing a beamformee that all beamformers have sent the null data packet, and the beamformee may start feedback.

As another example, when sequence indicating information sent by a primary beamformer BFer 1 may be received by BFer 2, BFer 2 may determine that itself is the last data packet indicated in the sequence indicating information according to the sequence indicating information, and BFer 2 may send a data packet end identifier at the same time of or after sending of an NDPA and an NDP to inform a beamformee that all beamformers have completed sending of a null data packet, and feedback of channel information may be started.

As another example, each beamformer sets indicating information in a channel measuring frame sent respectively, which is used for indicating whether the current channel measuring frame needs to be responsed immediately by a beamformee. For example, the case that '1' is set represents that it may not need to be responsed immediately by the beamformee, '0' represents that the channel measuring frame is a last channel measuring frame, and thereafter hopes to be responsed by the corresponding beamformee. In such case, '0' in the channel measuring frame is equivalent to a data packet sending end identifier.

Further, for a beamformee, it may execute the manner shown in FIG. 3 by default when sequence indicating information sent by BFer 1 is received. Or, it may determine to adopt the sequence manner of continuous sending of beamformers shown in FIG. 3 according to a certain feature or identifier, rather than the sequence manner shown in FIG. 1, for example, the sequence indicating information is carried in an NDPR, according to a carrying position of the sequence indicating information, namely the NDPR, the beamformee determines to adopt the manner shown in FIG. 3, namely, the channel information is not fed back immediately, but the NDPA and the NDP sent by following other beamformers are continued to be received until all beamformers end the sending. Or, a sequence type identifier is further carried besides carrying of the sequence indicating information, such as bit '0' is adopted to denote that a sequence indicated by the sequence indicating information is the manner shown in FIG. 1, and bit '1' denotes that a sequence indicated by the sequence indicating information is the manner shown in FIG. 3.

Before executing the Feedback Phase, the beamformee in the present embodiment needs to save the estimated channel information, for example, before the feedback, BFee 2 saves the channel information corresponding to the channel between BFee 2 and BFer 1 and the channel information corresponding to the channel between BFee 2 and BFer 2. Channel information sent by a beamformee to a beamformer associated with the beamformee includes channel information estimated according to NDPs received by the beamformee and sent by all beamformers, such as BF Reports shown in FIG. 3 (BFer 1 and BFer 2), namely, channel information between BFee 2 and BFer 1 and channel information between BFee 2 and BFer 2. Specific form of sending may adopt a frame aggregation, or may also adopt continuous multi-frame feedback.

In addition, a sequence that each beamformee feed back the channel information is not limited in the Feedback Phase in the present embodiment, for example, FIG. 3 shows that BFee 2 feeds back the channel information to BFer 1 first, and after BFer 1 sends the BF-Poll frame, BFee 1 feeds back the channel information to BFer 1; Or, it may be that BFee 1 feeds back the channel information to BFer 1 first, and after receiving the BF-Poll frame, BFee 2 feeds back the channel information to BFer 1. Or, other manners may be flexibly adopted to set the feedback sequence of beamformees.

Figure 5:
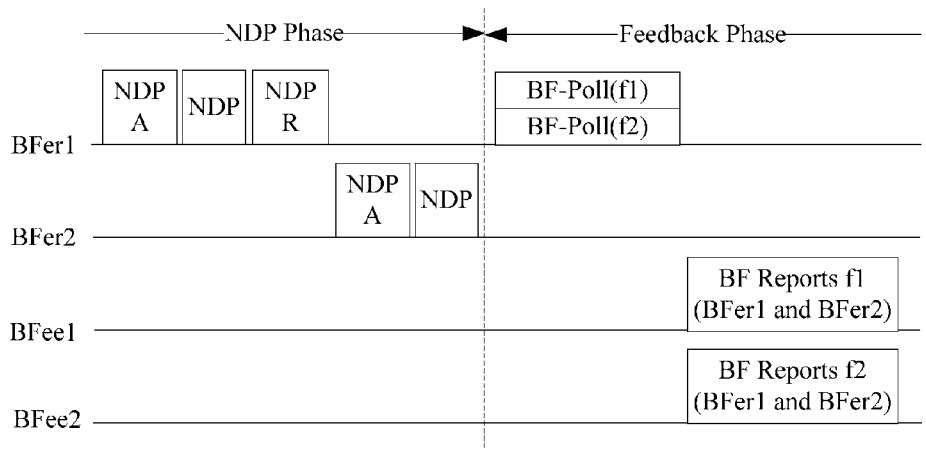
FIG. 5 is a schematic flow diagram of yet another embodiment of a method for channel information feedback in the present disclosure.

FIG. 5 is a schematic flow diagram of yet another embodiment of a method for channel information feedback in the present disclosure. In the above-mentioned embodiments, the feedback of the channel information is sent at intervals in a time domain by beamformees, for example, as shown is FIG. 1, BFee 1 feeds back the channel information to BFer 1 first, and after that BFee 2 feeds back the channel information to BFer 1. In the present embodiment, each beamformee may feed back channel information at the same time, and feedback of different beamformees is distinguished in a frequency domain.

As shown in FIG. 5, before obtaining channel feedback information, a primary beamformer BFer 1 may send frequency indicating information to a beamformee, so that the beamformee feeds back channel information at a frequency indicated by the frequency indicating information. For example, after an NDP Phase ends, BFer 1 sends a BF-Poll frame to multiple beamformees respectively on different frequency channels (such as f1 and f2) (in this case it is equivalent to that BFer 1 sends the frequency indicating information f1 or f2 to the beamformee). And after receiving the BF-Poll frame, the beamformee feeds back all its channel information to beamformer BFer 1 respectively on the corresponding frequency channels. Specifically it may be implemented by means of an orthogonal frequency division multiple access (OFDMA): BFer 1 sends different BF-Poll frames on multiple frequency bands by means of the OFDMA, and the corresponding beamformee feeds back the channel information to BFer 1 at the same time by means of an uplink OFDMA.

Figure 6:
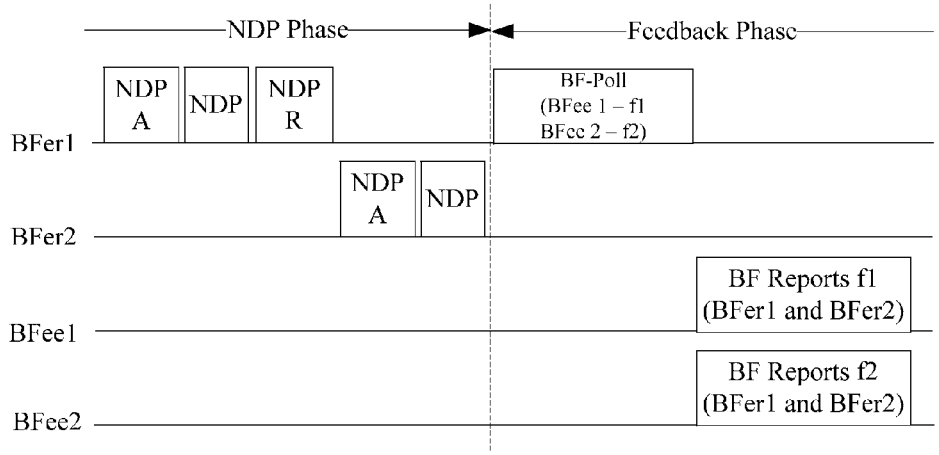
FIG. 6 is a schematic flow diagram of yet another embodiment of a method for channel information feedback in the present disclosure.

Optionally, BFer 1 may also send the BF-Poll frame without using the OFDMA, but frequency indicating information may be carried in the BF-Poll frame, and the frequency indicating information indicates that beamformees may feed back channel information to BFer 1 respectively on which frequency band, and the beamformees feed back the channel information on frequencies indicated by the frequency indicating information. See FIG. 6, FIG. 6 is a schematic flow diagram of yet another embodiment of a method for channel information feedback in the present disclosure.

Figure 7:
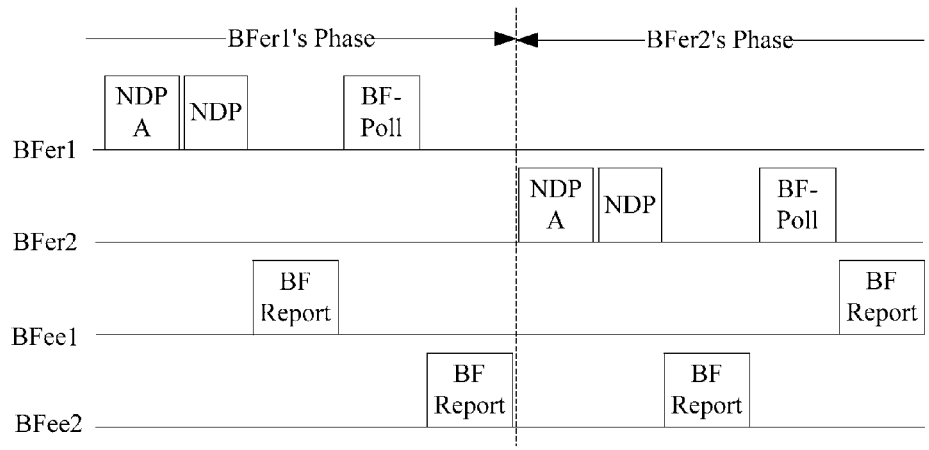
FIG. 7 is a schematic flow diagram of yet another embodiment of a method for channel information feedback in the present disclosure.

FIG. 7 is a schematic flow diagram of yet another embodiment of a method for channel information feedback in the present disclosure. The above embodiments take it as an example that beamformees feed back channel information to a primary beamformer BFer 1, in specific implementation, it may be that each beamformer obtains channel information related to the beamformer from beamformees, namely, each beamformer respectively obtains the channel information related to itself and shares the received channel information through a shared channel among beamformers, namely, channel information related to other beamformer is obtained from the other beamformer.

As shown in FIG. 7, each of BFer 1 and BFer 2 respectively executes its feedback process and obtains channel information related to itself. Taking BFer 1 as an example, BFer 1 obtains channel information fed back by BFee 1 and channel information fed back by BFee 2, and an obtaining manner is similar as that in FIG. 1, which will not be described in detail. For BFee 1 or BFee 2, after receiving an NDPA and an NDP sent by a beamformer, such as BFer 1, it will feed back channel information corresponding to a channel between itself and the beamformer to the beamformer.

After obtaining channel information, each beamformer may share the obtained channel information to other beamformers by means of a physical channel or a logical channel, for example, BFer 2 may transmit channel information obtained by itself to BFer 1 by means of a shared channel.

In a case that each beamformer obtains channel information respectively, each beamformer is responsible for an error of feedback channel information received by itself, namely, for a part need to be retransmitted, each beamformer is responsible for polling a beamformee related to itself.

Optionally, BFer 1 and BFer 2 shown in FIG. 7 may be divided into a primary beamformer and a secondary beamformer, and a sending sequence of the two beamformers is controlled by the primary beamformer. For example, primary beamformer BFer 1 carries sequence indicating information when sending an NDPA and an NDP, and a beamformee may also carry the sequence indicating information in a feedback frame of channel information, so that other beamformers send the NDPA and the NDP according to a sequence specified by the indicating information. Or, BFer 1 and BFer 2 shown in FIG. 7 may not be divided according to a time sequence, namely, BFer 1 and BFer 2 obtain related channel information respectively and separately without being divided into a primary beamformer and a secondary beamformer.

Figure 8:
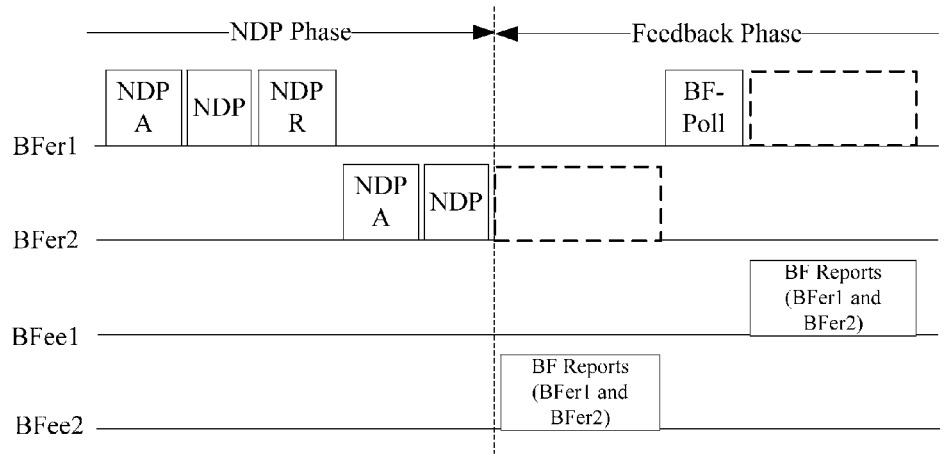
FIG. 8 is a schematic flow diagram of yet another embodiment of a method for channel information feedback in the present disclosure.
Figure 9:
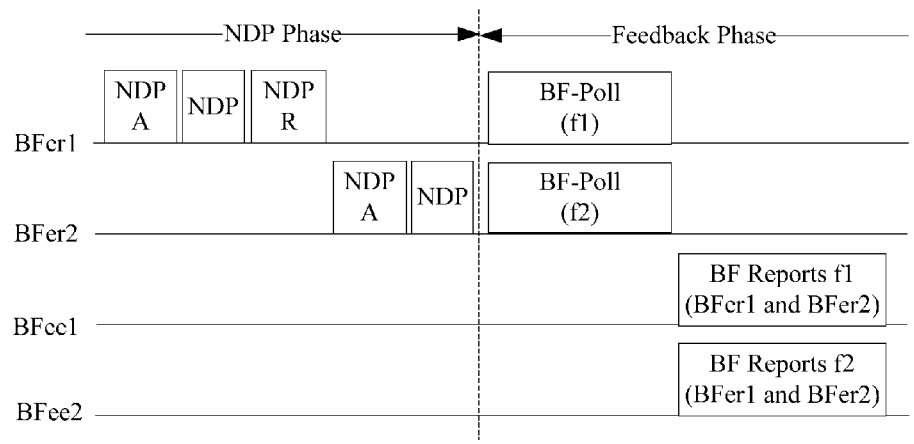
FIG. 9 is a schematic flow diagram of yet another embodiment of a method for channel information feedback in the present disclosure.

Similarly, in a case that sending an NDPA and an NDP among beamformers is controlled according to a sequence, it may also be that each beamformer respectively obtains channel information related to itself, rather than that all channel information is fed back to a primary beamformer. For example, see FIG. 8 and FIG. 9, FIG. 8 is a schematic flow diagram of yet another embodiment of a method for channel information feedback in the present disclosure, which is an improvement of FIG. 3. BFee 2 sends channel information measured by itself and respectively corresponding to BFer 1 and BFer 2 to BFer 2 in a same BSS with BFee 2, and BFee 1 sends channel information measured by itself and respectively corresponding to BFer 1 and BFer 2 to BFer 1 in a same BSS with BFee 1. FIG. 9 is a schematic flow diagram of yet another embodiment of a method for channel information feedback in the present disclosure. BFer 1 sends a BF-Poll frame to BFee 1 on a frequency channel f1, and BFee 1 sends channel information measured by itself and respectively corresponding to BFer 1 and BFer 2 to BFer 1 in a same BSS with BFee 1; BFer 2 sends a BF-Poll frame to BFee 2 on a frequency channel f2, and BFee 2 sends channel information measured by itself and respectively corresponding to BFer 1 and BFer 2 to BFer 2 in a same BSS with BFee 2.

It can be seen from FIG. 7-FIG. 9 that a beamformeer obtains a part of channel feedback information from beamformees and obtains other part of the channel feedback information from other beamformer, and the part and the other part described herein are relatively flexible.

For example, in FIG. 7, BFer 1 obtains a part of channel feedback information from beamformees (including BFee 1 and BFee 2) (namely, channel information fed back by BFee 1 and channel information fed back by BFee 2), and obtains other part from other beamformer (i.e. BFer 2) (namely, channel information fed back by BFee 1 and BFee 2 to BFer 2 in FIG. 7), namely the part that the beamformer obtained from the beamformees is related to itself and is of channels between itself and the beamformees.

As another example, in FIG. 8, a part (BF Reports (BFer 1 and BFer2)) of channel feedback information that BFer 2 obtained from beamformee BFee 2 is not all related to BFer 2, only channel information of a channel between BFee 2 and BFer 2 is related to BFer 2, and channel information of a channel between BFee 2 and BFer 1 is related to BFer 1. It is similar in FIG. 9.

Figure 10:
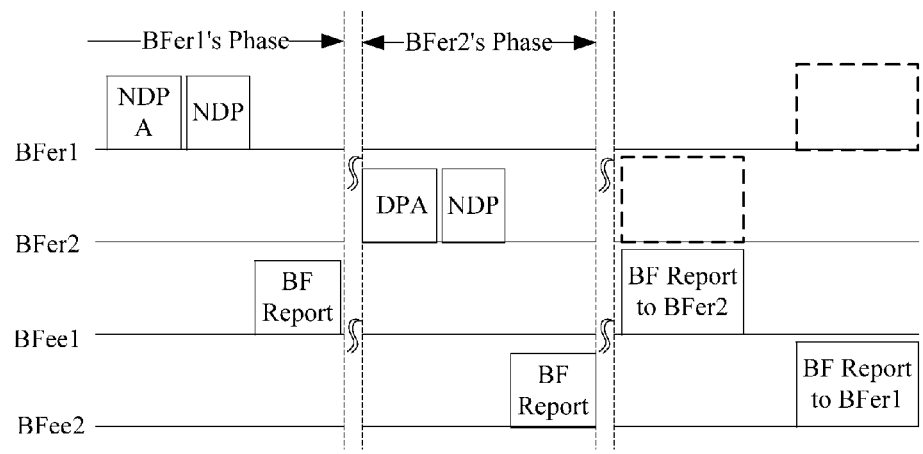
FIG. 10 is a schematic flow diagram of yet another embodiment of a method for channel information feedback in the present disclosure.

FIG. 10 is a schematic flow diagram of yet another embodiment of a method for channel information feedback in the present disclosure. In the present embodiment, neither a time of sending an NDPA and an NDP by each beamformer is restrained, namely, there is no time sequence among beamformers, nor a time that each beamformee feeds back channel information is restrained.

As shown in FIG. 10, it may be implemented between each beamformer and beamformees in a same BSS with the beamformer according to an existing channel feedback process, after an NDPA and an NDP are sent, channel information fed back by a beamformee in a same BSS will be received, such as channel information fed back by BFee 1 to BFer 1. And other part of channel information, such as channel information fed back by BFee 1 to BFer 2, may be sent after a variable time interval. Here the variable time interval refers to that a beamformee may flexibly feed back channel information of a beamformer in a different BSS by means of an idle time of a channel, so as to use the time more effectively. In FIG. 10, a beamformee feeds back estimated channel information of a beamformer in an adjacent BSS to the beamformer, for example, BFee 1 feeds back estimated channel information between itself and BFer 2 to BFer 2.

Figure 11:
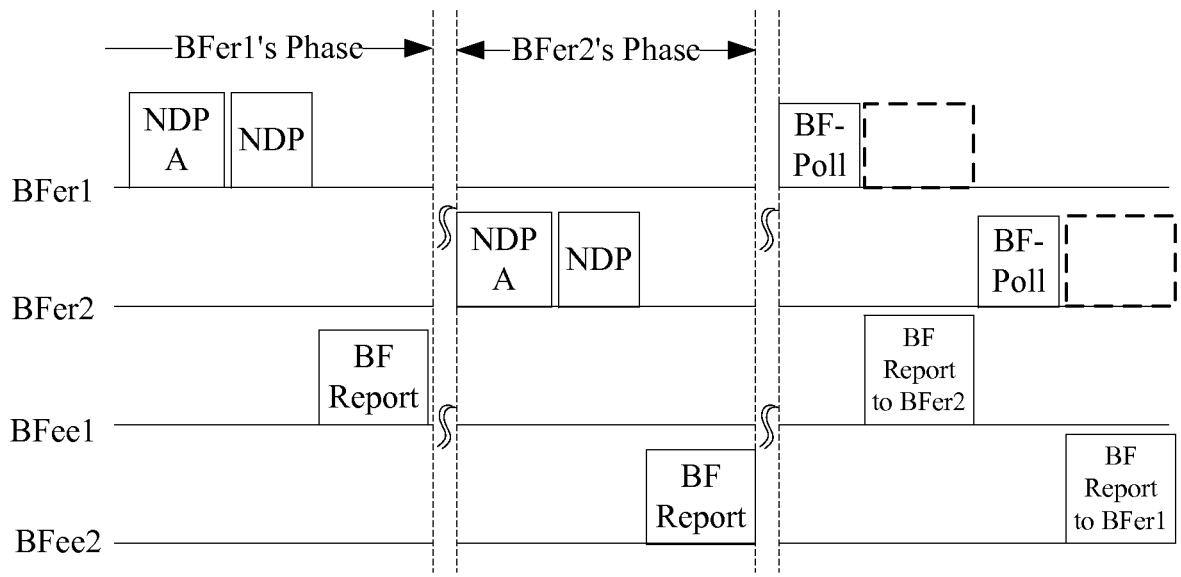
FIG. 11 is a schematic flow diagram of yet another embodiment of a method for channel information feedback in the present disclosure.

Optionally, a beamformer may also flexibly use a BF-Poll frame to poll a beamformee, so as to obtain channel information of a different beamformer. For example, see FIG. 11, FIG. 11 is a schematic flow diagram of yet another embodiment of a method for channel information feedback in the present disclosure. A beamformee may also feed back estimated channel information of a beamformer in an adjacent BSS to a beamformer in a same BSS, for example, BFee 1 feeds back estimated channel information between itself and BFer 2 to BFer 1.

As can be seen from the above FIG. 10 and FIG. 11, when a beamformee feeds back channel feedback information to a beamformer, feedback may be performed separately in terms of time. For example, a beamformee sends first channel information in channel feedback information to a beamformer in a same BSS, the first channel information is channel information related to the beamformer in the same BSS. And after a variable time interval, the beamformee feeds back second channel information in the channel feedback information, the second channel information is channel information related to a beamformer in a different BSS, and the second channel information is fed back to the beamformer in the same BSS or the beamformer in the different BSS. Here the variable time interval may be that the beamformee performs sending by means of an idle time of a channel.

The above-mentioned embodiments are optional methods for channel information feedback and these methods may also be applied to other wireless communication systems obtaining the right to use of a channel based on contention.

The present embodiment provides a beamformer, and the beamformer may perform the method for channel information feedback in any embodiment of the present disclosure.

The beamformer includes a data packet sending unit and an information obtaining unit, where the data packet sending unit is configured to send a channel measuring frame to a beamformee; the information obtaining unit is configured to receive channel feedback information from the beamformee or other beamformer, and the channel feedback information is obtained by the beamformee performing channel estimation according to the channel measuring frame. The channel feedback information includes: channel information related to the beamformer and channel information related to other beamformer, and the channel information includes: channel information fed back by a beamformee in a same basic service set and channel information fed back by a beamformee in a different basic service set. The beamformer may be a primary beamformer or a secondary beamformer, or may be any beamformer without distinguishing a primary beamformer and a secondary beamformer.

Figure 12:
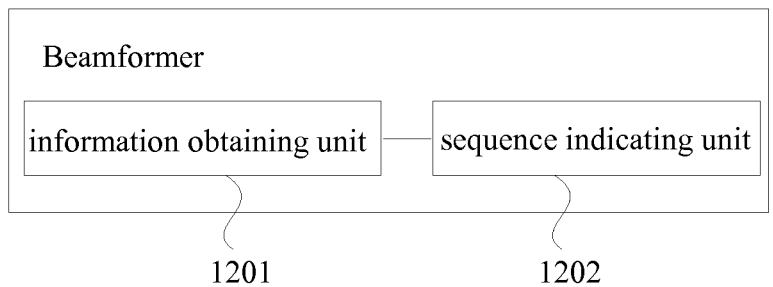
FIG. 12 is a schematic structural diagram of an embodiment of a beamformer in the present disclosure.

FIG. 12 is a schematic structural diagram of an embodiment of a beamformer in the present disclosure. For example, the beamformer is a primary beamformer, as shown in FIG. 12, which may include: an information obtaining unit 1201 and a sequence indicating unit 1202.

The information obtaining unit 1201 is configured to obtain channel feedback information, and the channel feedback information includes: channel information related to the beamformer and channel information related to other beamformer; the sequence indicating unit 1202 is configured to send sequence indicating information, so that the other beamformer sends a channel measuring frame used for obtaining the channel information according to a sequence specified by the sequence indicating information.

Further, the sequence specified by the sequence indicating information sent by the sequence indicating unit 1202, specifically indicates that the other beamformer starts sending the channel measuring frame after a previous beamformer completes an execution of a local feedback process.

Further, the sequence specified by the sequence indicating information sent by the sequence indicating unit 1202, specifically indicates that other beamformer starts sending the channel measuring frame after a previous beamformer completes an execution of sending a channel measuring frame.

For example, the sequence indicating unit 1202 may specifically carry the sequence indicating information in the channel measuring frame sent by the beamformer, and the channel measuring frame, for example, is at least one of the following: a beamforming polling BF-Poll frame, a null data packet announcement, a null data packet and a null data packet request, and a data frame or a management frame which has a function of channel measurement (its channel estimation sequence is same as or greater than the number of antennas, or the number of plentiful pilots).

Optionally, information obtaining unit 1201 is specifically configured to receive the channel feedback information from the beamformee.

Figure 13:
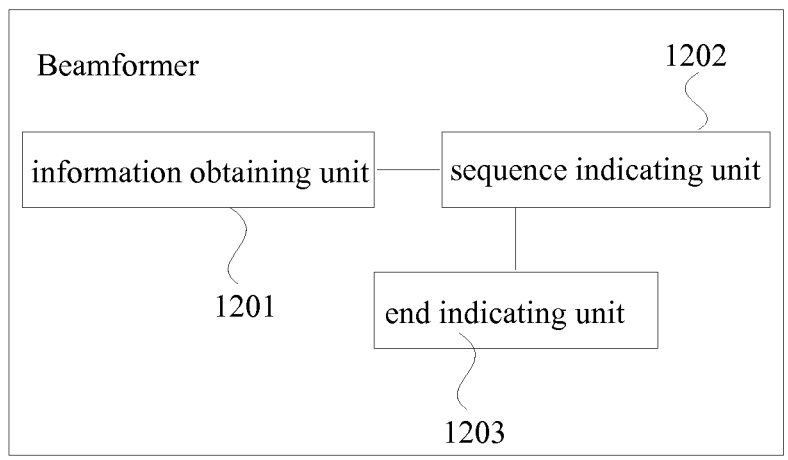
FIG. 13 is a schematic structural diagram of another embodiment of a beamformer in the present disclosure.

FIG. 13 is a schematic structural diagram of another embodiment of a beamformer in the present disclosure. When the sequence specified by the sequence indicating information sent by the sequence indicating unit 1202 specifically indicates that the other beamformer starts sending the channel measuring frame after the previous beamformer completes the execution of sending the channel measuring frame, the beamformer may further include: an end indicating unit 1203, configured to send a data packet sending end identifier, where the data packet sending end identifier is used for informing the beamformee that all other beamformers have sent the channel measuring frame.

Figure 14:
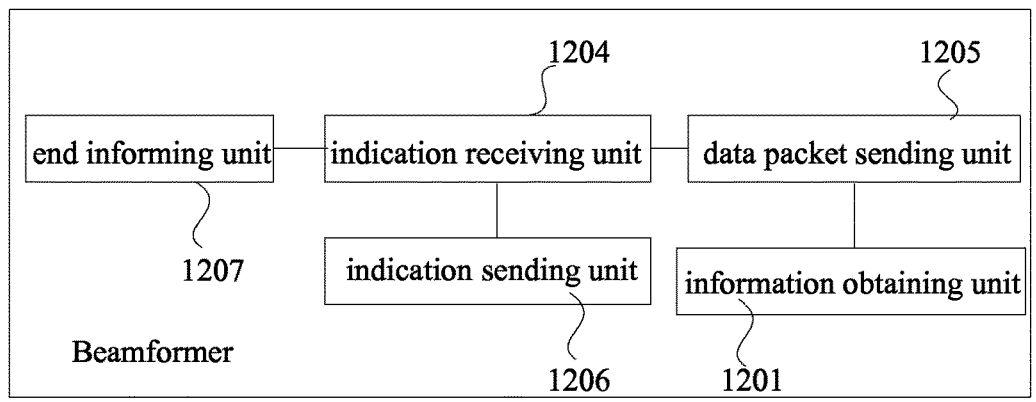
FIG. 14 is a schematic structural diagram of yet another embodiment of a beamformer in the present disclosure.

FIG. 14 is a schematic structural diagram of yet another embodiment of a beamformer in the present disclosure. For example, the beamformer is a secondary beamformer, as shown in FIG. 14, which may include: an information obtaining unit 1201, an indication receiving unit 1204 and a data packet sending unit 1205, where, the information obtaining unit 1201 is configured to receive channel feedback information, where the channel feedback information includes: channel information related to the beamformer and channel information related to other beamformer;

the indication receiving unit 1204 is configured to receive first sequence indicating information;

the data packet sending unit 1205 is configured to send a channel measuring frame to a beamformee according to a sequence specified by the first sequence indicating information.

Further, the indication receiving unit 1204 is specifically configured to receive the first sequence indicating information sent by another beamformer; or, obtain the first sequence indicating information carried in channel information fed back by the beamformee to another beamformer.

Further, it may further include: an indication sending unit 1206, configured to send second sequence indicating information to the beamformee when the data packet sending unit sends the channel measuring frame to the beamformee, where the second sequence indicating information at least includes a sequence of sending a data packet by other beamformers after the beamformer.

Further, the data packet sending unit 1205 is specifically configured to start sending the channel measuring frame after a previous beamformer in a time domain completes an execution of a local feedback process.

Further, the data packet sending unit 1205 is specifically configured to start sending the channel measuring frame after a previous beamformer in a time domain completes an execution of sending a channel measuring frame.

Further, it may further include: an end informing unit 1207, configured to send a data packet sending end identifier to the beamformee when it is determined that the channel measuring frame sent by the beamformer is a last data packet indicated in the first sequence indicating information according to the first sequence indicating information, where the data packet sending end identifier is used for informing the beamformee that all beamformers have sent the channel measuring frame.

Figure 15:
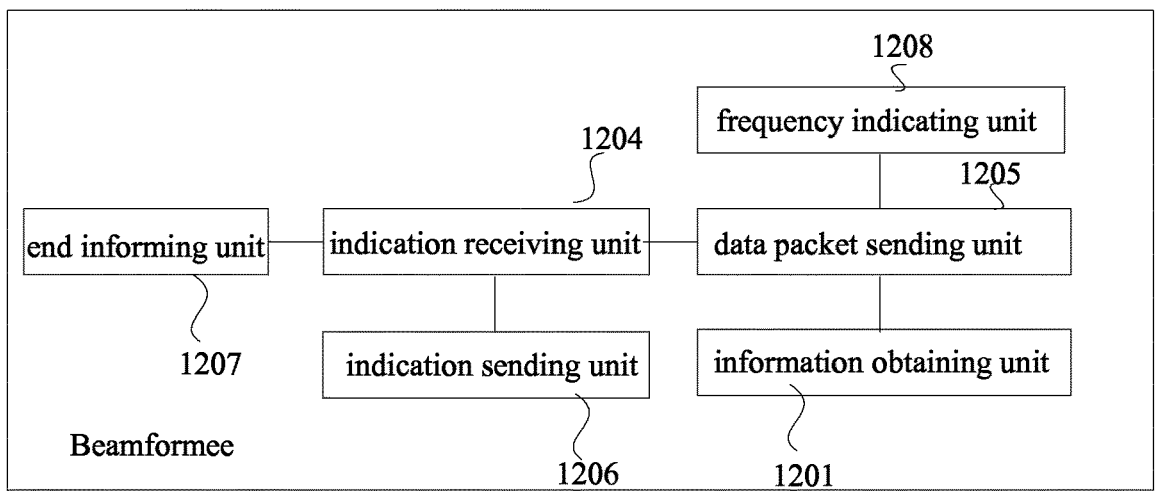
FIG. 15 is a schematic structural diagram of yet another embodiment of a beamformer in the present disclosure.

FIG. 15 is a schematic structural diagram of yet another embodiment of a beamformer in the present disclosure, the beamformer may further include: a frequency indicating unit 1208, configured to send frequency indicating information to the beamformee, so that the beamformee feeds back the channel information at a frequency indicated by the frequency indicating information. Certainly the beamformer shown in FIG. 12 and FIG. 13 may further include the frequency indicating unit.

Optionally, in the beamformer of FIG. 12-FIG. 15, the information obtaining unit 1201 is specifically configured to obtain a part of the channel feedback information from the beamformee, and obtain other part of the channel feedback information from other beamformer.

Optionally, when obtaining the part of the channel feedback information from the beamformee, the information obtaining unit 1201 is specifically configured to receive channel information fed back by a beamformee in a same basic service set; the other part and the channel information fed back by the beamformee in the same basic service set are at a variable time interval.

Figure 16:
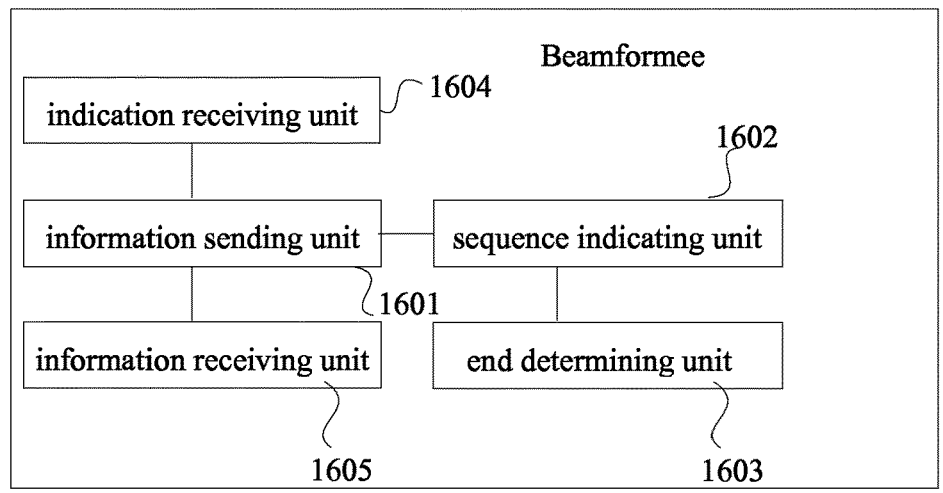
FIG. 16 is a schematic structural diagram of an embodiment of a beamformee in the present disclosure.

The present embodiment provides a beamformee, and the beamformee may perform the method for channel information feedback in any embodiment of the present disclosure. FIG. 16 is a schematic structural diagram of an embodiment of a beamformee in the present disclosure. As shown in FIG. 16, the beamformee may include: an information receiving unit 1605 and an information sending unit 1601, where the information receiving unit 1605 is configured to receive a channel measuring frame sent by a beamformer; the information sending unit 1601 is configured to perform channel estimation to obtain channel feedback information according to the channel measuring frame, and send the channel feedback information to the beamformer. The channel feedback information includes: channel information related to a beamformer in a same basic service set and channel information related to a beamformer in a different basic service set.

Optionally, it may further include: a sequence indicating unit 1602, configured to send sequence indicating information to the beamformer, so that the beamformer sends the channel measuring frame according to a sequence specified by the sequence indicating information.

Optionally, it may further include: an end determining unit 1603, configured to determine that the received channel measuring frame is sent by a last beamformer indicated in the sequence indicating information before the information sending unit sends the channel feedback information to the beamformer.

Further, the end determining unit 1603 is configured to compare a beamformer indentifier corresponding to the received channel measuring frame with the sequence indicating information, and determine that the beamformer is the last beamformer; or, determine that the beamformer is the last beamformer according to a received data packet sending end identifier, where the data packet sending end identifier is used for informing the beamformee that all beamformers have sent the channel measuring frame.

Further, the information sending unit 1601 is specifically configured to send the channel feedback information to a primary beamformer; or, send the channel feedback information to a beamformer which sends the channel measuring frame.

Further, it may further include: an indication receiving unit 1604, specifically configured to receive frequency indicating information sent by the beamformer; the information sending unit 1601 is specifically configured to feed back the channel information at a frequency indicated by the frequency indicating information.

Further, the information sending unit 1601 is specifically configured to send first channel information in the channel feedback information to the beamformer in the same basic service set, where the first channel information is channel information related to the beamformer in the same basic service set; after a variable time interval, the beamformee feeds back second channel information in the channel feedback information, where the second channel information is channel information related to the beamformer in the different basic service set, and the second channel information is fed back to the beamformer in the same basic service set or the beamformer in the different basic service set.

It should be noted that, the beamformer shown in above FIG. 12-FIG. 14 only shows the units shown in the figures, but it does not limit that the beamformer merely includes these units, certainly it may also include other units.

Figure 17:
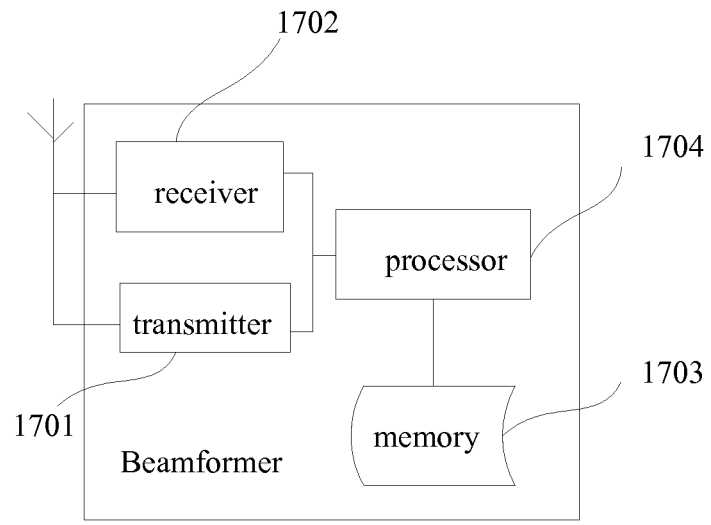
FIG. 17 is a schematic structural diagram of an entity of an embodiment of a beamformer in the present disclosure.

FIG. 17 is a schematic structural diagram of an entity of an embodiment of a beamformer in the present disclosure. As shown in FIG. 17, the beamformer includes a transmitter 1701, a receiver 1702, a memory 1703 and a processor 1704 respectively connected to the transmitter 1701, the receiver 1702 and the memory 1703. Certainly, the beamformer may include general parts such as an antenna, a baseband processing part, an intermediate ratio frequency processing part, an input/output device and the like, and no limit is to be made herein by the embodiments of the present disclosure.

A set of program code is stored in the memory 1703, and the processor 1704 is configured to invoke the program code stored in the memory 1703 to perform the following operations:

sending a channel measuring frame to a beamformee through the transmitter 1701, and receiving channel feedback information from the beamformee or other beamformer through the receiver 1702, where the channel feedback information is obtained by the beamformee performing channel estimation according to the channel measuring frame; the channel feedback information includes: channel information related to the beamformer and channel information related to other beamformer. The channel information includes: channel information fed back by a beamformee in a same basic service set and channel information fed back by a beamformee in a different basic service set. The beamformer may be a primary beamformer or a secondary beamformer, or may also be any beamformer without distinguishing a primary beamformer and a secondary beamformer.

Further, the processor 1704 may send sequence indicating information, so that the other beamformer sends a channel measuring frame used for obtaining the channel information according to a sequence specified by the sequence indicating information. For example, the sequence specified by the sequence indicating information specifically indicates that the other beamformer starts sending the channel measuring frame after a previous beamformer completes an execution of a local feedback process. For another example, the sequence specified by the sequence indicating information specifically indicates that the other beamformer starts sending the channel measuring frame after a previous beamformer completes an execution of sending a channel measuring frame.

Further, the processor 1704 may receive first sequence indicating information and send the channel measuring frame to the beamformee according to a sequence specified by the first sequence indicating information. For example, it is specifically configured to receive the first sequence indicating information sent by another beamformer; or, obtain the first sequence indicating information carried in channel information fed back by the beamformee to another beamformer.

Further, the processor 1704 may send second sequence indicating information to the beamformee when the data packet sending unit sends the channel measuring frame to the beamformee, where the second sequence indicating information at least includes a sequence of sending a data packet by other beamformers after the beamformer.

Further, the processor 1704 may send a data packet sending end identifier to the beamformee when it is determine that the channel measuring frame sent by the beamformer is a last data packet indicated in the first sequence indicating information according to the first sequence indicating information, where the data packet sending end identifier is used for informing the beamformee that all beamformers have sent the channel measuring frame.

Figure 18:
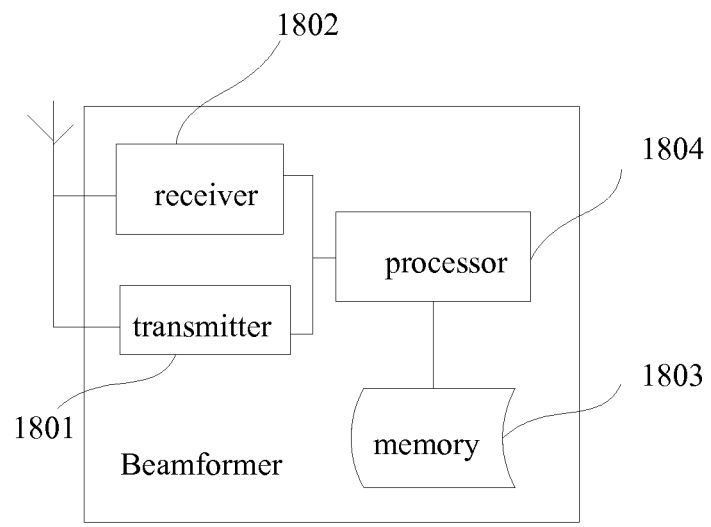
FIG. 18 is a schematic structural diagram of an entity of an embodiment of a beamformee in the present disclosure.

FIG. 18 is a schematic structural diagram of an entity of an embodiment of a beamformee in the present disclosure. As shown in FIG. 18, the beamformee includes a transmitter 1801, a receiver 1802, a memory 1803 and a processor 1804 respectively connected to the transmitter 1801, the receiver 1802 and the memory 1803. Certainly, the beamformee may include general parts such as an antenna, a baseband processing part, an intermediate ratio frequency processing part, an input/output device and the like, and no limit is to be made herein by the embodiments of the present disclosure.

A set of program code is stored in the memory 1803, and the processor 1804 is configured to invoke the program code stored in the memory 1803 to perform the following operations:

receiving a channel measuring frame sent by a beamformer through the receiver 1802, performing channel estimation to obtain channel feedback information according to the channel measuring frame, and sending the channel feedback information to the beamformer through the transmitter 1801. The channel feedback information includes: channel information related to a beamformer in a same basic service set and channel information related to a beamformer in a different basic service set.

Further, the processor 1804 may send sequence indicating information to the beamformer, so that the beamformer sends the channel measuring frame according to a sequence specified by the sequence indicating information.

Further, the processor 1804 determines that the received channel measuring frame is sent by a last beamformer indicated in the sequence indicating information before it sends the channel feedback information to the beamformer. For example, the processor 1804 compares a beamformer indentifier corresponding to the received channel measuring frame with the sequence indicating information, and determine that the beamformer is the last beamformer; or, determine that the beamformer is the last beamformer according to a received data packet sending end identifier, where the data packet sending end identifier is used for informing the beamformee that all beamformers have sent the channel measuring frame.

Further, the processor 1804 receives frequency indicating information sent by the beamformer and feeds back the channel information at a frequency indicated by the frequency indicating information.

Those of ordinary skill in the art may understand that all or a part of the steps for achieving the above-mentioned method embodiments may be implemented with a program instructing corresponding hardware. The foregoing program may be stored in a computer readable storage medium. When being executed, the program may execute the steps of the above-mentioned method embodiments; the foregoing storage medium includes a variety of media capable of storing program codes, such as an ROM, an RAM, a magnetic disk, an optical disk or the like.

What is claimed is:

1. A method for channel information feedback, comprising:

sending, by a first beamformer, a first channel measuring frame to a first beamformee in a same basic service set and a second beamformee in a different basic service set, wherein the first beamformer is associated with the first beamformee to form the same basic service set, and a second beamformer is associated with the second beamformee to form the different basic service set; and sending, by the first beamformer, order indicating information, so that the second beamformer sends a second channel measuring frame used for obtaining channel information according to an order specified by the order indicating information, wherein the first beamformer is a primary beamformer, the order indicating information indicates that the second beamformer starts sending the second channel measuring frame after a previous beamformer completes an execution of sending a channel measuring frame; and receiving, by the first beamformer, first channel feedback information from the first beamformee, and second channel feedback information from the second beamformee, wherein the first channel feedback information is obtained by the first beamformee performing channel estimation according to the first channel measuring frame and the second channel measuring frame, and the first channel feedback information comprises: channel information related to the first beamformer and channel information related to the second beamformer, the second channel feedback information is obtained by the second beamformee performing channel estimation according to the first channel measuring frame and the second channel measuring frame, and the second channel feedback information comprises: channel information related to the first beamformer and channel information related to the second beamformer.

2. The method according to claim 1, further comprising:
sending, by the first beamformer, a data packet sending end identifier, wherein the data packet sending end identifier is used for informing a beamformee that all other beamformers have sent a channel measuring frame.

3. The method according claim 1, wherein the order indicating information is carried in the first channel measuring frame.

4. The method according claim 1, further comprising:
sending, by the first beamformer, frequency indicating information to beamformees, so that beamformees feed back information at frequencies indicated by the frequency indicating information.

5. A method for channel information feedback, comprising:

receiving, by a first beamformee, a first channel measuring frame sent by a first beamformer;

sending, by the first beamformee, order indicating information to a second beamformer, so that the second beamformer sends a second channel measuring frame according to an order specified by the order indicating information, the order indicating information indicates that the second beamformer starts sending the second channel measuring frame after a previous beamformer completes an execution of sending a channel measuring frame;

receiving, by the first beamformee, the second channel measuring frame sent by the second beamformer, wherein the first beamformee is associated with the first beamformer to form a same basic service set, and a second beamformee is associated with the second beamformer to form a different basic service set;

performing, by the first beamformee, channel estimation to obtain first channel feedback information according to the first channel measuring frame and the second channel measuring frame; and sending, by the first beamformee, the first channel feedback information to the first beamformer, wherein the first channel feedback information comprises: channel information related to the first beamformer in the same basic service set and channel information related to the second beamformer in the different basic service set.

6. The method according to claim 5, further comprising:
determining, by the first beamformee, that the received channel measuring frame is sent by a last beamformer indicated in the order indicating information.

7. The method according to claim 6, wherein the determining, by the first beamformee, that the received channel measuring frame is sent by the last beamformer indicated in the order indicating information, comprises:
comparing, by the first beamformee, a beamformer indentifier corresponding to the received channel measuring frame with the order indicating information, and determining that the beamformer is the last beamformer.

8. The method according to claim 5, wherein the sending, by the first beamformee, the first channel feedback information to the first beamformer, comprises:
sending, by the first beamformee, the first channel feedback information to a primary beamformer.

9. The method according claim 5, wherein the order indicating information is carried in the channel information related to the first beamformer.

10. A beamformer, comprising:
a processor; and
a non-transitory computer-readable storage medium comprising computer-executable instructions that, when executed by the processor, facilitate executing a method comprising the steps:
sending a first channel measuring frame to a first beamformee in a same basic service set and a second beamformee in a different basic service set, wherein the beamformer is associated with the first beamformee to form the same basic service set, and a second beamformer is associated with the second beamformee to form the different basic service set;
sending, by the first beamformer, order indicating information, so that the second beamformer sends a second channel measuring frame used for obtaining channel information according to an order specified by the order indicating information, wherein the first beamformer is a primary beamformer, the order indicating information indicates that the second beamformer starts sending the second channel measuring frame after a previous beamformer completes an execution of sending a channel measuring frame; and
receiving first channel feedback information from the first beamformee, and second channel feedback information from the second beamformee, wherein the first channel feedback information is obtained by the first beamformee performing channel estimation according to the first channel measuring frame and the second channel measuring frame, and the first channel feedback information comprises: channel information related to the beamformer and channel information related to the second beamformer, the second channel feedback information is obtained by the second beamformee performing channel estimation according to the first channel measuring frame and the second channel measuring frame, and the second channel feedback information comprises: channel information related to the beamformer and channel information related to the second beamformer.

11. The beamformer according to claim 10, wherein the storage medium further comprises steps for:
sending a data packet sending end identifier, wherein the data packet sending end identifier is used for informing a beamformee that all other beamformers have sent a channel measuring frame.

12. A beamformee, comprising:
a processor; and
a non-transitory computer-readable storage medium comprising computer-executable instructions that, when executed by the electronic processor hardware, facilitate executing a method comprising the steps:
receiving a first channel measuring frame sent by a first beamformer;
sending order indicating information to a second beamformer, so that the second beamformer sends a second channel measuring frame according to an order specified by the order indicating information, the order indicating information indicates that the second beamformer starts sending the second channel measuring frame after a previous beamformer completes an execution of sending a channel measuring frame;
receiving the second channel measuring frame sent by the second beamformer, wherein the beamformee is associated with the first beamformer to form a same basic service set, and a second beamformee is associated with the second beamformer to form a different basic service set;
performing channel estimation to obtain first channel feedback information according to the first channel measuring frame and the second channel measuring frame; and sending the first channel feedback information to the first beamformer, wherein the first channel feedback information comprises: channel information related to the first beamformer in the same basic service set and channel information related to the second beamformer in the different basic service set.

13. The beamformee according to claim 12, wherein the storage medium further comprises steps for:
determining that the received channel measuring frame is sent by a last beamformer indicated in the order indicating information before the information sending unit sends the channel feedback information to the beamformer.

14. The beamformee according to claim 13, wherein the storage medium further comprises steps for: comparing a beamformer indentifier corresponding to the received channel measuring frame with the order indicating information, and determine that the beamformer is the last beamformer.

15. The beamformee according to claim 12, wherein the storage medium further comprises steps for: sending the first channel feedback information to a primary beamformer.

* * * * *